(12) United States Patent
Gantillon et al.

(10) Patent No.: US 11,059,981 B2
(45) Date of Patent: *Jul. 13, 2021

(54) AQUEOUS SEMI-FINISHED AND PRIMARY NON-STICK COATING COMPOSITIONS COMPRISING AROMATIC POLYMERS

(71) Applicant: SEB S.A., Ecully (FR)

(72) Inventors: Barbara Gantillon, Leschaux (FR); Isabelle Joutang, La Motte Servolex (FR); Anne Teissier, Annecy (FR)

(73) Assignee: SEB S.A.

( * ) Notice: Subject to any disclaimer, the term of this patent is extended or adjusted under 35 U.S.C. 154(b) by 0 days.

This patent is subject to a terminal disclaimer.

(21) Appl. No.: 15/320,547

(22) PCT Filed: Jun. 12, 2015

(86) PCT No.: PCT/FR2015/051571
§ 371 (c)(1),
(2) Date: Dec. 20, 2016

(87) PCT Pub. No.: WO2015/193594
PCT Pub. Date: Dec. 23, 2015

(65) Prior Publication Data
US 2017/0158868 A1    Jun. 8, 2017

(30) Foreign Application Priority Data

Jun. 20, 2014 (FR) ..................... 1455723
Dec. 30, 2014 (FR) ..................... 1463459

(51) Int. Cl.
| | | |
|---|---|---|
| C09D 5/03 | (2006.01) | |
| C09D 7/40 | (2018.01) | |
| C09D 127/18 | (2006.01) | |
| A47J 36/02 | (2006.01) | |
| C09D 181/06 | (2006.01) | |
| C09D 181/04 | (2006.01) | |
| C09D 171/00 | (2006.01) | |
| C09D 179/08 | (2006.01) | |
| B05D 5/08 | (2006.01) | |
| C09D 5/02 | (2006.01) | |
| B05D 7/00 | (2006.01) | |
| C09D 127/12 | (2006.01) | |
| C09D 7/65 | (2018.01) | |
| C09D 5/08 | (2006.01) | |
| C23C 26/00 | (2006.01) | |
| C09D 7/20 | (2018.01) | |
| B05D 7/14 | (2006.01) | |

(52) U.S. Cl.
CPC ............. C09D 5/031 (2013.01); A47J 36/02 (2013.01); A47J 36/025 (2013.01); B05D 5/08 (2013.01); B05D 5/083 (2013.01); B05D 7/542 (2013.01); C09D 5/024 (2013.01); C09D 5/033 (2013.01); C09D 5/08 (2013.01); C09D 7/20 (2018.01); C09D 7/65 (2018.01); C09D 7/69 (2018.01); C09D 127/12 (2013.01); C09D 127/18 (2013.01); C09D 171/00 (2013.01); C09D 179/08 (2013.01); C09D 179/085 (2013.01); C09D 181/04 (2013.01); C09D 181/06 (2013.01); C23C 26/00 (2013.01); B05D 7/14 (2013.01); B05D 2202/25 (2013.01); C08G 2650/40 (2013.01)

(58) Field of Classification Search
CPC ............ C09D 5/031; C08K 5/34; C08K 7/16
USPC ........................................ 524/592
See application file for complete search history.

(56) References Cited

U.S. PATENT DOCUMENTS

| | | | | |
|---|---|---|---|---|
| 3,143,241 A | * | 8/1964 | Howell .............. | A47J 36/02 220/573.2 |
| 3,271,653 A | * | 9/1966 | Wolf ................ | A47J 36/02 219/438 |
| 3,393,086 A | * | 7/1968 | Keating ............ | A47J 36/02 220/573.2 |
| 3,495,735 A | * | 2/1970 | Ulam ............... | A47J 36/02 220/573.2 |
| 5,910,558 A | | 6/1999 | Schoenherr et al. | |
| 6,228,932 B1 | * | 5/2001 | Saito .................. | C08K 3/22 523/220 |
| 6,333,372 B1 | | 12/2001 | Tomihashi et al. | |
| 2015/0072091 A1 | * | 3/2015 | Gantillon .......... | C09D 179/08 428/35.9 |
| 2017/0002209 A1 | * | 1/2017 | Gantillon .......... | B05D 5/083 |
| 2017/0152400 A1 | * | 6/2017 | Gantillon .......... | C09D 179/08 |

FOREIGN PATENT DOCUMENTS

| | | |
|---|---|---|
| CN | 103465574 A | 12/2013 |
| EP | 1103582 A1 | 5/2001 |
| GB | 1592886 | 7/1981 |
| JP | 2009242711 A | 10/2009 |
| WO | 99/32565 A2 | 7/1999 |

* cited by examiner

Primary Examiner — Jane L Stanley
(74) Attorney, Agent, or Firm — Lerner, David, Littenberg, Krumholz & Mentlik, LLP

(57) ABSTRACT

Provided is an aqueous amine-free coating composition including at least one aromatic polymer, wherein the aromatic polymer is in the form of powder having a $d_{90}$ less than or equal to 20 µm and in that the aqueous coating composition further includes polar aprotic solvent at a content greater than 0% by weight and less than or equal to 25% by weight. Also provided is an aqueous amine-free non-stick coating composition including such an aqueous composition for a coating, and the respective methods for producing same. Further provided is a method for producing an item on one of the faces of a metal substrate, from at least one layer of the coating composition or one layer of the non-stick coating composition.

7 Claims, No Drawings

AQUEOUS SEMI-FINISHED AND PRIMARY NON-STICK COATING COMPOSITIONS COMPRISING AROMATIC POLYMERS

CROSS-REFERENCE TO RELATED APPLICATIONS

This application is the United States national phase of International Application No. PCT/FR2015/051571 filed Jun. 12, 2015, and claims priority to French Patent Application Nos. 1455723 and 1463459 filed Jun. 20, 2014, and Dec. 30, 2014, respectively, the disclosures of which are hereby incorporated in their entirety by reference.

FIELD OF THE INVENTION

This invention pertains generally to aqueous coating compositions (or semi-finished compositions), as well as aqueous non-stick coating compositions (or primary compositions) comprising such coating compositions. The coating compositions and non-stick coating compositions according to this invention offer improved stability in terms of viscosity over time and film formation. In addition, the non-stick coatings obtained based on these compositions offer improved resistance to corrosion, high temperatures and abrasion, as well as reduced yellowing.

For the purposes of this invention, the term "aqueous composition" refers to any composition comprising mostly water, or in other words at least 50% water by weight, with respect to the total weight of said composition.

The invention pertains to the field of formulating semi-finished and primary non-stick coating compositions designed to be applied to heating items, and more specifically, cooking tools or household appliances, as well as to the field of such non-stick coatings.

Examples of cooking tools that can be used within the scope of this invention include frying pans, sauté pans, saucepans, woks, crepe pans, stockpots, crockpots, pressure cookers, egg cookers and grill pans.

Examples of household appliances that can be used within the scope of this invention include fryer vats, melting pots or heavy saucepans for fondue or raclette, and iron soleplates.

DESCRIPTION OF RELATED ART

Experts in the field know that cooking tools must meet certain performance criteria with regard to their non-stick and scratch-resistant properties, and more generally, their resistance to the many stresses to which they are subjected during use.

Fluorinated polymer-based coatings are the ones that offer the best compromise for all of these properties. Nevertheless, one difficulty remains regarding the adhesion of these coatings to the medium of the tool, and a great many solutions have been proposed.

A significant component of the formulations designed to improve the adhesion of polytetrafluoroethylene (PTFE) is made using an adhesive co-resin. Among the most commonly used resins, we find aromatic polymers, such as polyether ether ketones (PEEK), polyether ketones (PEK), polyethersulfones (PES) and polyphenylene sulfides (PPS). For use in combination with PTFE colloidal dispersions, these adhesive co-resins must necessarily first be put into an aqueous phase, generally in the presence of a polar aprotic solvent.

For the purposes of this invention, the term "aromatic polymer" refers to any polymer with at least one monomer pattern comprising at least one cyclical system that satisfies Hückel's rule of aromaticity.

It should be noted that most polar aprotic solvents are subject to labeling as a harmful or even toxic product, according to the REACH regulation (European Parliament and Council Regulation on the Registration, Evaluation, Authorization and Restriction of Chemicals). As a result, the environmental and health-related impact caused by the use of such solvents is non-negligible.

For the purposes of this invention, the term "toxic or harmful solvent" refers to a solvent containing category 1A or 1B chemicals considered to be carcinogens, mutagens or reproductive toxicants, and on which hazard pictograms must be displayed to inform users of the risks and dangers associated with this type of product (as defined in EC Regulation 1272/2008 of the European Parliament and Council of Sep. 16, 2008 and its adjustments with scientific and technical progress).

U.S. Pat. No. 5,910,558 describes a primary composition based on an aromatic polymer (such as PES or PEK) in solution in a polar aprotic solvent that can be applied to cooking tools to form an even non-stick coating. In particular, the composition in U.S. Pat. No. 5,910,558 comprises PES or PEK in powder form, consisting of spherical grains, the particle size of which is between 2 and 70 µm, and preferably between 5 and 50 µm, a polar aprotic solvent such as NMP, and a thermoplastic polymer that may be PTFE. This composition does not contain any Lewis base, but has a high proportion of (notably toxic) polar aprotic solvent.

However, the processes and composition in this document require regular particles to be obtained, which is difficult to implement, especially when one wishes to obtain thin coatings.

In addition, such compositions with a high proportion of polar aprotic solvent present the well-known disadvantages that the compositions obtained are subject to labeling as toxic compositions, as applicable, and that the compositions obtained result in coatings with low abrasion resistance that have a tendency to yellow.

U.S. Pat. No. 6,333,372 describes aqueous fluorinated primary coating compositions comprising a fluorine resin, a polyethersulfone and at least one resin chosen from among PAI and PI. The average particle size of PES and PAI/PI 8 µm or less. The dispersion medium of the primary composition is water, but an organic solvent such as NMP can be added in high proportions to the composition.

However, such compositions have high polar aprotic solvent contents, which, over time, results in stability problems, in terms of viscosity, in the semi-finished and primary compositions obtained.

SUMMARY OF THE INVENTION

To remedy the disadvantages of the prior art, the applicant has developed aqueous semi-finished and primary compositions which improve stability over time, and which improve the film formation of the layers deposited, and which also make it possible to obtain coatings with improved resistance to corrosion, high temperatures and abrasion, as well as reduced yellowing.

More specifically, the objective of this invention is an aqueous, amine-free coating composition (or semi-finished composition) that comprises:

At least one aromatic polymer selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK) and derivatives thereof; and, A polar aprotic solvent, the content of polar aprotic solvent in the coating composition being greater than 0% and less than or equal to 25% by weight, with respect to the total weight of the coating composition;

the one or more aromatic polymers being in powder form with a $d_{90}$ of less than or equal to 20 μm.

Such a polar aprotic solvent content makes it possible to obtain semi-finished compositions with good stability in terms of viscosity and good film formation properties.

In addition, such a particle size makes it possible to obtain thin coatings that are abrasion-resistant. Moreover, this particle size further reduces the sedimentation effect in the semi-finished composition.

For the purposes of this invention, the term "$d_{90}$" refers to the size at which 90% by volume of the population consists of particles that are smaller than said size.

Advantageously, the one or more aromatic polymers are in powder form, also having a $d_{50}$ of less than or equal to 10 μm.

For the purposes of this invention, the term "$d_{50}$" refers to the size at which 50% by volume of the population consists of particles that are smaller than said size (median of the particle distribution).

Advantageously, the one or more aromatic polymers are in powder form, having a minimum $d_{50}$ on the order of 3 μm and a minimum $d_{90}$ of 10 μm.

In this invention, the semi-finished composition is amine-free.

For the purposes of this invention, the term "amine" refers to any nitrogenous compound that is formally derived from ammonia $NH_3$ by replacing one or more hydrogen atoms with carbon groups, such as primary amines, secondary amines, tertiary amines, heterocyclic amines, aliphatic diamines, aliphatic oligoamines, ether amines, ethanol amines, isopropanol amines and alkyl amino alcohols.

Advantageously, the semi-finished composition according to the invention comprises between 0 and 21% polar aprotic solvent by weight, with respect to the total weight of the semi-finished composition.

The solvent used in the semi-finished composition according to this invention may preferably comprise at least one of the following: N-formylmorpholine (NFM), dimethyl sulfoxide (DMSO), N-acetylmorpholine (NAM), N-ethylpyrrolidone (NEP) and N-methylpyrrolidone (NMP).

To obtain non-labeled (or in other words, non-toxic) primary compositions, it is necessary for the concentration of toxic ("labeled") polar aprotic solvent to be as low as possible, or even zero. Moreover, adding only a small quantity of such a solvent to the semi-finished composition limits the yellowing of the coating. In addition to yellowing, a high content of these toxic polar aprotic solvents is needlessly expensive.

Consequently, the semi-finished composition according to the invention advantageously comprises a maximum of 2% toxic polar aprotic solvent by weight, and preferably a maximum of 0.3% by weight, with respect to the total weight of the semi-finished composition.

Advantageously, the polar aprotic solvent is non-toxic, and preferably comprises at least one of the following: N-formylmorpholine (NFM) and dimethyl sulfoxide (DMSO).

Advantageously, the degree of polymerization of the aforementioned one or more aromatic polymers is greater than or equal to 5. For the purposes of this invention, the term "degree of polymerization of a polymer" refers to the number of repetitions of the base pattern(s) in that polymer.

In one embodiment of this invention, the coating composition as described above may also comprise at least one heterocyclic polymer, in powder form, with a $d_{90}$ of less than or equal to 20 μm, the relative aromatic polymer content by weight, with respect to the heterocyclic polymer in the coating composition, being greater than or equal to 50:50 and less than 100:0, and preferably greater than or equal to 88:12 and less than or equal to 100:0.

For the purposes of this invention, the term "heterocyclic polymer" refers to any polymer with at least one monomer pattern comprising at least one heterocycle. For the purposes of this invention, the term "heterocycle" refers to any cycle having at least two different elements as atoms in the cycle.

The one or more heterocycle polymers may each advantageously have an acid value of between 1 and 200 mg of KOH/g.

Advantageously, these one or more heterocyclic polymers are selected from the group comprising polyimides (PI), polyamide-imides (PAI), polyether imides (PEI), polyamide-amic acids and their mixtures. These polymers offer a high level of temperature resistance and good hardness, which can be attributed to the aromatic patterns of their structure.

Advantageously, the degree of polymerization of the aforementioned one or more heterocyclic polymers is greater than or equal to 5.

Advantageously, the combination of such a heterocyclic polymer with the aromatic polymer described above makes it possible to further improve the adhesion of the coatings obtained on media.

Another objective of this invention is an aqueous, amine-free, non-stick coating composition (or aqueous primary composition), which comprises an aqueous coating composition and at least one fluorocarbon resin, the non-stick coating composition comprising a polar aprotic solvent content of greater than 0% and less than or equal to 15% by weight, with respect to the total weight of the non-stick coating composition.

The aqueous coating composition used in the non-stick coating composition comprises:

At least one aromatic polymer selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK), and derivatives thereof, and being in powder form with a $d_{90}$ of less than or equal to 20 μm; and, as applicable, A polar aprotic solvent, the content of polar aprotic solvent in the coating composition being between 0% and 25% by weight, with respect to the total weight of the coating composition.

The aromatic polymer is as described in reference to the aqueous coating composition described above.

Preferably, the primary composition according to the invention comprises between 8 and 15% polar aprotic solvent by weight, with respect to the total weight of said primary composition.

Advantageously, the solvent used in the aqueous primary composition preferably comprises at least one of the following: N-formylmorpholine (NFM), dimethyl sulfoxide (DMSO), N-acetylmorpholine (NAM), N-ethylpyrrolidone (NEP) and N-methylpyrrolidone (NMP).

The primary composition according to the invention advantageously comprises a maximum of 1% toxic polar aprotic solvent by weight, and preferably a maximum of 0.3%, with respect to the total weight of the primary composition.

Advantageously, the polar aprotic solvent is non-toxic. The polar aprotic solvent may preferably comprise at least one of the following: N-formylmorpholine (NFM) and dimethyl sulfoxide (DMSO). Adding a non-toxic polar aprotic solvent to the composition makes it possible to obtain a non-labeled (or in other words, non-toxic) primary composition.

Thus, the risks and dangers to the environment and people's health are limited. In addition, the use of non-toxic formulations is considerably easier, as these formulations can be used with only a minimum of precautions.

Advantageously, the one or more fluorocarbon resins are chosen from the group comprising the following: polytetrafluoroethylene (PTFE), copolymers of tetrafluoroethylene and perfluoropropyl vinyl ether (PFA), copolymers of tetrafluoroethylene and hexafluoropropene (FEP), polyvinylidene fluoride (PVDF), copolymers of tetrafluoroethylene and poly(methyl vinyl ether) (MVA), terpolymers of tetrafluoroethylene, poly(methyl vinyl ether) and fluoroalkyl vinyl ether (TFE/PMVE/FAVE), ethylene tetrafluoroethylene (ETFE) and their mixtures.

Advantageously, the fluorocarbon resin is polytetrafluoroethylene (PTFE) or a mixture of PTFE and PFA (PTFE/PFA), or a mixture of PTFE and FEP (PTFE/FEP).

Advantageously, the fluorocarbon resin accounts for 1 to 99%, and preferably 30 to 80% by weight, of the total dry weight of the primary composition.

If the primary composition does not comprise a heterocyclic polymer as stated above, the relative aromatic polymer content by weight, with respect to the fluorocarbon resin, is between 20:80 and 25:75.

If the primary composition comprises at least one heterocyclic polymer as stated above, the total relative content by weight of the aromatic polymer and the heterocyclic polymer, with respect to the fluorocarbon resin, is between 20:80 and 25:75.

Advantageously, the primary composition according to the invention also comprises at least one filler.

Advantageously, the filler accounts for less than 40%, and preferably between 3 and 20% by weight, of the total dry weight of the primary composition.

Advantageously, the filler comprises silica nanoparticles and/or alumina nanoparticles and/or silicon carbide nanoparticles.

Another objective of this invention is a process for the preparation of an aqueous coating composition as defined above, comprising the following steps:

The provision of at least one aromatic polymer in powder form, the aromatic polymer being selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK), and derivatives thereof;

The preparation of a mixture comprising water and the powder from step (a); and

The grinding of the mixture resulting from step (b) to obtain a ground mixture comprising the aromatic polymer in powder form having a $d_{90}$ of less than or equal to 20 µm, to which polar aprotic solvent is added during the preparation of step (b) and/or to the ground mixture resulting from step (c), the polar aprotic content in the coating composition being greater than 0% and less than or equal to 25% by weight, with respect to the total weight of said composition.

In one embodiment of the process of preparing a semi-finished composition according to the invention, the process also comprises a step (a') of providing at least one heterocyclic polymer in powder form, and in which:

The mixture resulting from step (b) also comprises the powder from step (a'); and The grinding from step (c) makes it possible to obtain a ground mixture comprising the aromatic polymer and said heterocyclic polymer in powder form having a $d_{90}$ of less than or equal to 20 µm; and The relative aromatic polymer content by weight, with respect to the heterocyclic polymer in the ground mixture resulting from step (c) is greater than or equal to 50:50 and less than 100:0.

In another embodiment of the process of preparing a semi-finished composition according to the invention, the process also comprises the following steps:

a') The provision of at least one heterocyclic polymer in powder form;

b') The preparation of a mixture comprising water and the powder from step (a');

c') The grinding of the mixture resulting from step (b') to obtain a ground mixture comprising said heterocyclic polymer in powder form having a $d_{90}$ of less than or equal to 20 µm; and d) The mixing of the ground mixture resulting from step (c) and the ground mixture resulting from step (c');

the relative aromatic polymer content by weight, with respect to the heterocyclic polymer in the mixture resulting from step (d), being greater than or equal to 50:50 and less than 100:0.

Advantageously, in the process of preparing a semi-finished composition according to this other embodiment, solvent is added:

during the preparation of step (b'); and/or
to the ground mixture resulting from step (c'); and/or
to the mixture resulting from step (d).

Another objective of this invention is a process of preparing an aqueous coating composition as defined above, comprising at least one aromatic polymer, comprising the following steps:

The provision of at least one aromatic polymer selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK), and derivatives thereof, in powder form;

a') The provision of at least one heterocyclic polymer in powder form;

b) The preparation of a mixture comprising water and the powder from step (a);

e) The grinding of the mixture resulting from step (b) to obtain a ground mixture comprising the aromatic polymer;

f) The preparation of a mixture comprising the ground mixture resulting from step (e) and the powder from step (a'); and g) The grinding of the mixture resulting from step (f) to obtain a ground mixture comprising the heterocyclic polymer and said aromatic polymer in powder form having a $d_{90}$ of less than or equal to 20 µm, the relative aromatic polymer content by weight, with respect to the heterocyclic polymer in the mixture resulting from step (g) being greater than 50:50 and less than 100:0; to which polar aprotic solvent is added:
during the preparation of step (b); and/or
to the ground mixture resulting from step (e); and/or
during the preparation of step (f); and/or
to the ground mixture resulting from step (g);
the polar aprotic solvent content in the coating composition being greater than 0% and less than or equal to 25% by weight, with respect to the total weight of said semi-finished composition.

Another objective of this invention is another process of preparing an aqueous coating composition comprising at least one aromatic polymer as defined above, comprising the following steps:

a) The provision of at least one aromatic polymer selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK), and derivatives thereof, in powder form;

a') The provision of at least one heterocyclic polymer in powder form;

b') The preparation of a mixture comprising water and the powder from step (a');

e') The grinding of the mixture resulting from step (b') to obtain a ground mixture comprising the heterocyclic polymer;

f') The preparation of a mixture comprising the ground mixture resulting from step (e') and the powder from step (a); and g') The grinding of the mixture resulting from step (f') to obtain a ground mixture comprising the heterocyclic polymer and the aromatic polymer in powder form having a $d_{90}$ of less than or equal to 20 µm;

the relative aromatic polymer content by weight, with respect to the heterocyclic polymer in the mixture resulting from step (g') being greater than 50:50 and less than 100:0; to which polar aprotic solvent is added:
during the preparation of step (b'); and/or
to the ground mixture resulting from step (e'); and/or
during the preparation of step (f'); and/or
to the ground mixture resulting from step (g');
the polar aprotic solvent content in the coating composition being greater than 0% and less than or equal to 25% by weight, with respect to the total weight of said semi-finished composition.

Advantageously, the grinding in any of the processes of preparing a semi-finished composition according to the invention is a mechanical grinding at room temperature or an ultrasonic grinding.

Another objective of this invention is a process of preparing an aqueous non-stick coating composition as defined above, comprising the mixture of at least one fluorocarbon resin with the aqueous coating composition as defined above or as prepared according to any of the processes of preparing a coating composition as defined above, or an aqueous coating composition comprising:

at least one aromatic polymer selected from the group comprising polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), polyether ketone ether ketone ketones (PEKEKK), and derivatives thereof, in powder form, having a $d_{90}$ of less than or equal to 20 µm; and as applicable, a polar aprotic solvent, the content of polar aprotic solvent in the coating composition being between 0 and 25% by weight, with respect to the total weight of the coating composition.

The one or more fluorocarbon resins may be in powder form or in an aqueous dispersion.

Another objective of this invention is a process of producing an item comprising the following steps:

The provision of a metal substrate with two opposite surfaces;

The application, to one of the surfaces of said substrate, of at least one layer of aqueous semi-finished composition as defined above or as prepared according to any of the processes of preparing a coating composition as defined above or of at least one layer of aqueous primary composition as defined above or as prepared according to the process of preparing a non-stick coating composition as defined above; and then, The baking of the entire set at a temperature of between 300° C. and 430° C.

Advantageously, the process of producing an item according to the invention may also comprise, between the application step (ii) and the baking step (iii), the application, to said layer of semi-finished composition or primary composition, of at least one layer of finishing composition comprising at least one fluorocarbon resin.

Another objective of this invention is an item that can be obtained according to the process of producing an item as described above.

The item according to the invention can be a cooking tool, one of the surfaces of which is a concave, interior surface designed to be in contact with food placed inside said tool, and the other surface is a convex, exterior surface designed to be in contact with a heat source.

The invention is illustrated in greater detail in the following examples.

DETAILED DESCRIPTION OF THE INVENTION

Examples

Products
Media
Simply degreased, smooth aluminum media
Aqueous Semi-Finished Compositions
Polymer resins:
Polyphenylene sulfide (PPS) resin, with a degree of polymerization of 100;
Polyethersulfone (PES) resin, micronized grade, with a degree of polymerization of greater than 50;
Heterocyclic polymer resin:
Polyamide-amic acid in aqueous moist powder form with 35.5% dry matter, containing less than 5% N-methylpyrrolidone (NMP) by weight, being of food grade and having a degree of polymerization on the order of 8;
Acrylic resin: 30% acrylic polymer solution in aqueous phase;
Non-labeled (or in other words, non-toxic, as the term is defined in this invention) polar aprotic solvents:

N-formylmorpholine (NFM)
Ammonium hydroxide $NH_4OH$ (d=0.9)

Aqueous Primary Compositions

Non-labeled (or in other words, non-toxic, as the term is defined in this invention) polar aprotic solvents:
N-formylmorpholine (NFM)
Labeled (or in other words, toxic, as the term is defined in this invention) polar aprotic solvents:
N-ethylpyrrolidone (NEP)
Filler: Colloidal silica without surface modification, which has a specific surface of approximately 220 $m^2/g$, and which is in the form of an aqueous dispersion of nanoparticles with 30% dry matter
Carbon black dispersion at 25% dry matter
PTFE dispersion at 60% dry matter
Alkylphenol ethoxylate-based non-ionic surfactant system at 13% dry matter Tests Determining the Dry Matter of an Aqueous Semi-Finished or Primary Composition Principle The dry matter of a product is the residual solid portion remaining after evaporation of the volatile materials it contains. The temperature and duration of drying play a major role, as solvents with a high boiling point, monomer fractions, reactive thinners and reaction byproducts (depending on their degree of retention) are very slow to leave the film being formed. It is therefore very important to define, in a very conventional manner, standardized drying conditions that are as close as possible to actual conditions in practice.

Procedure

The procedure to measure this dry matter is as follows:
An aluminum dish is weighed: $m_0$=mass of the dish;
0.5 g to 3 g of the test product is placed in that dish;
The filled dish is weighed: $m_1$=mass of the filled dish;
The dish is placed in an oven at 210° C. for two hours;
After baking and cooling, the dish is weighed: $m_2$=mass of the filled dish after baking and cooling;
The dry matter is determined by the formula below:

$$\text{Dry matter}=100*[(m_2-m_0)/(m_1-m_0)]$$

Measurement of the Size and Size Distribution of the Particles by Light Diffraction for Powders in Sizes of Between Approximately 100 nm and Approximately 5 mm After grinding the products in this invention, the ground powder is collected and its particle size is characterized using a laser diffraction particle size analyzer sold under the commercial name Mastersizer by the company Malvern.

Evaluation of the Adhesion of a Semi-Finished or Primary Layer on a Smooth Aluminum Substrate A cross-cut test is performed in accordance with ISO standard 2409, followed by an immersion of the coated item for 18 hours (consisting of an alternation of three 3-hour cycles in boiling water and three 3-hour cycles in oil at 200° C.). Then, the non-stick coating is observed for signs of detachment.

The rating is as follows:
No square must be detached to obtain a rating of 100 (excellent adhesion);
In case of detachment, the rating value is equal to the rating of 100 minus the number of detached squares.

Yellowing Evaluation

After baking, the coated plates are evaluated visually for yellowing by comparison between the plates.

Evaluation of the Viscosity Stability of the Semi-Finished and Primary Compositions This is an evaluation of the stability of the viscosity of the semi-finished and primary compositions applied by spray, in which the flow time is measured according to standard DIN EN ISO 2433/ASTM D5125 using a 2.5-mm flow cup or a 4-mm flow cup.

Viscosity is measured as the continuous flow time, expressed in seconds, of the volume of the flow cup through the calibrated orifice. The flow cup is chosen based on the presumed viscosity of the product.

Change in viscosity is monitored by measuring the continuous flow time of the standardized volume at room temperature directly after the compositions are prepared, and by monitoring the change in this viscosity over time at room temperature.

Once formulated, the compositions are placed in an oven at 40° C.; the change in flow time, and therefore in the viscosity (evaluation of the stability of the emulsion after aging at 40° C.), is then monitored over time.

The semi-finished and primary compositions are evaluated as compliant when they show no signs of settling and have a stable viscosity, or in other words, a viscosity that does not increase by more 20% over two months of storage at room temperature.

Evaluation of the Film Formation Properties of the Semi-Finished and Primary Compositions The film formation properties of the compositions are related to the corrosion resistance of the layer obtained from said composition. Thus, a composition with good film formation properties will coat the medium perfectly during application and thus provide a layer offering good performance in terms of corrosion.

The corrosion resistance of a coating on a sandblasted aluminum substrate is evaluated by measuring its resistance to the diffusion of salt toward the metal substrate, which corrodes.

The procedure for this is as follows:
The substrate is coated with a layer of semi-finished and primary composition according to the examples and comparative examples below;
The substrate, thus coated, is immersed for 20 hours in an aqueous saline solution brought to the boiling point (this saline solution comprises 10% sodium chloride by weight. The protocol for this test is the one defined in AFNOR standard NF D21-511 $3.3.5.);
After each immersion, a visual inspection is performed of the final appearance of the coating, which consists of noting the presence or absence of signs of corrosion (by a visual observation with the naked eye or with a binocular loupe). In practice, it is a matter of detecting any signs such as blisters with extended areas, or white marks beneath the coating;
This observation is followed by a cross-cut test in accordance with ISO standard 2409.

The rating for the cross-cut test is as follows:
No square must be detached to obtain a rating of 100 (excellent adhesion);
In case of detachment, the rating value is equal to the rating of 100 minus the number of detached squares.

Operating Principle of the Jar Mill (Mechanical Grinding)

Principle

Bead grinding consisting of loading a jar with the sample to be ground and "grinding" beads, and rotating the jar around its axis at a certain speed. The jar is generally rotated by means of a roller machine. The sample can be ground in dry form or dispersed in an appropriate solvent (e.g. in water or alcohol). The dispersion may also contain certain adjuvants (like a dispersing agent or an anti-foaming agent).

Definition of the Main Grinding Parameters

Selection of Grinding Beads (Volume and Diameter(s))

The average diameter of the grinding beads must be appropriate for the size of the particles being ground. The finer the particles, the smaller the diameter of the beads that must be used. The total volume of beads, including the spaces between the beads, will account for approximately 50-60% of the interior volume of the jar. The beads of different sizes are advantageously distributed according to the following proportion by weight, with respect to the total weight of the beads: 25% small beads, 50% medium beads and 25% large beads. The size of the smallest beads is between 2 and 10 mm. Alumina and stabilized zirconia are commonly used as material for the beads.

Volume of Material in the Mill

To limit wear and tear on the grinding beads, the load being ground must cover the load of beads entirely. In general, it will be a volume corresponding to approximately 25% of the volume of the jar.

If the load being ground is a dry powder, the volume of beads will be adjusted after a few minutes of grinding. Because grinding reduces the size of the particles as well as the volume of the spaces between particles, it is necessary to periodically check whether the volume of load being ground is sufficient to cover all of the beads. If this is no longer the case, it is necessary to remove the excess beads to limit contamination of the powder as much as possible.

The duration of the grinding depends on the nature of the polymer resin being ground and on the desired final particle size.

Operating Principle of the Discontimill® Grinding Mill

This grinding is a mechanical grinding that consists of reducing the size of the particles and grains of different types of materials, during which the suspension of the particles and grains is maintained under refrigeration.

The grinding operations are performed with a planetary mill, which consists of a disc, attached to which are two grinding jars, each having a volume of 45 mL and being able to hold up to 7 grinding beads that are 15 mm in diameter. The jars and the grinding beads are made of zirconium oxide, a material known for its very high resistance to impact and wear, enabling grinding for extended durations.

The grinding system operates by rotating the disc holding the jars around their own axes. The rotation speed is the same for the tray and the jars, varying from 100 rev/min to 800 rev/min. However, the directions of rotation are opposite, so as to generate opposing centrifugal forces.

Example 1 of an Aqueous Semi-Finished Composition (SF1)

Preparation of an Aqueous, Amine-Free, Semi-Finished Composition According to the Invention (SF1) with Polar Aprotic Solvent.

An aqueous semi-finished composition (SF1) is produced with the following components, the respective quantities of which are listed below:

| | |
|---|---|
| Polyethersulfone (100% dry matter): | 119.1 g |
| NFM: | 136.0 g |
| Demineralized water: | 402.0 g |
| Ammonia: | 4.7 g |
| Acrylic resin: | 9.0 g |
| TOTAL | 670.8 g |

To make the aqueous semi-finished composition (SF1), an initial polyethersulfone powder is used, the particle size of which ranges from 20 μm to 10 mm, and more specifically a $d_{90}$ of between 40 and 60 μm and a $d_{50}$ of between 20 and 40 μm.

Placing the PES in suspension comprises a grinding step, the grinding being done in a Discontimill® brand bead mill at room temperature for a duration ranging from 15 to 30 hours, and preferably 12 to 24 hours, to reduce the size of the PES particles.

The process is as follows:

The polyethersulfone powder is placed into the jar; then,

The demineralized water and the polar aprotic solvent are added to the mill;

Next, the acrylic resin, and then the ammonia are added to the mill; and finally;

The grinding step is performed.

The properties of the aqueous composition (SF1) thus obtained are as follows:

Theoretical dry matter: 18.2%

Dry matter measured in the composition: 18.1%

This is a suspension that is opaque white in color.

The pH of this composition is between 6 and 7.

Viscosity (in a 4-mm flow cup according to standard DIN EN ISO 2433/ASTM D5125) >30 sec: after ageing at 40° C., the composition (SF1) is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of between 5 and 10 μm and a $d_{90}$ of 19 μm, which confirms that all of the powder has been placed in suspension.

Example 2 of an Aqueous Semi-Finished Composition (SF2)

Preparation of an Aqueous, Amine-Free, Semi-Finished Composition (SF2) with Polar Aprotic Solvent.

An aqueous semi-finished composition (SF2) is produced with the following components, the respective quantities of which are listed below:

| | |
|---|---|
| Polyethersulfone (100% dry matter): | 119.1 g |
| NFM: | 100.0 g |
| Demineralized water: | 438.0 g |
| Ammonia: | 4.7 g |
| Acrylic resin: | 9.0 g |
| TOTAL | 670.8 g |

To produce the aqueous semi-finished composition (SF2), an initial polyethersulfone powder is used, having a particle size ranging from 20 μm to 10 mm, and more specifically, a $d_{90}$ of between 40 and 60 μm and a $d_{50}$ of between 20 and 40 μm.

Placing the PES in suspension comprises a grinding step, the grinding being done in a Discontimill® brand bead mill at room temperature for a duration ranging from 15 to 30 hours, and preferably 12 to 24 hours, to reduce the size of the PES particles.

The process is as follows:

The polyethersulfone powder is placed into the mill; then,

The demineralized water and the polar aprotic solvent are added to the mill;

Next, the acrylic resin, and then the ammonia are added to the mill; and finally,
The grinding step is performed.
The properties of the aqueous composition (SF2) thus obtained are as follows:
Theoretical dry matter: 18.2%
Dry matter measured in the composition: 18.1%
This is a suspension that is opaque white in color.
The pH of this composition is between 6 and 7.
Viscosity (in a 4-mm flow cup according to standard DIN EN ISO 2433/ASTM D5125) >30 sec: after aging at 40° C., the composition (SF2) is still stable after 60 days of storage, and the change in viscosity over time is less than 20%.
A light diffraction particle sizing measurement using the Mastersizer laser particle size analyzer shows that a main peak is reached at $d_{50}$, centered on an average diameter of between 5 and 10 μm and a $d_{90}$ of 19 μm, which confirms that all of the powder has been placed in suspension.

Example 3 of an Aqueous Semi-Finished Composition (SF3)

Preparation of an Aqueous, Amine-Free, Semi-Finished Composition According to the Invention (SF3) with Polar Aprotic Solvent.
An aqueous semi-finished composition (SF3) is produced with the following components, the respective quantities of which are listed below:

| | |
|---|---|
| Polyethersulfone (100% dry matter): | 89.3 g |
| Polyphenylene sulfide (100% dry matter): | 29.8 g |
| NFM: | 100.0 g |
| Demineralized water: | 438.0 g |
| Ammonia: | 4.7 g |
| Acrylic resin: | 9.0 g |
| TOTAL | 670.8 g |

To produce the aqueous semi-finished composition (SF3), a mixture of polyethersulfone powder and polyphenylene sulfide is used.
Placing this powder mixture in suspension comprises a grinding step, the grinding being done in a Discontimill® brand bead mill at room temperature for a duration ranging from 15 to 30 hours, and preferably 12 to 24 hours, to reduce the size of the particles in the resin mixture.
The process is as follows:
The polyethersulfone powder, and then the ammonia, are placed into the mill; then,
The polyphenylene sulfide powder is placed into the mill;
The demineralized water and the polar aprotic solvent are added to the mill;
The acrylic resin is then added to the mill; and finally,
The grinding step is performed.
The properties of the aqueous composition (SF3) thus obtained are as follows:
Theoretical dry matter: 18.2%
Dry matter measured in the composition: 18.3%
This is a suspension that is opaque white in color.
The pH of this composition is between 6 and 7.
Viscosity (in a 4-mm flow cup according to standard DIN EN ISO 2433/ASTM D5125) >30 sec: after ageing at 40° C., the composition (SF3) is still stable after 60 days of storage, and the change in viscosity over time is less than 20%.

A light diffraction particle sizing measurement using the Mastersizer laser particle size analyzer shows that a main peak is reached at $d_{50}$, centered on an average diameter of 5 to 10 μm and a $d_{90}$ of 19 μm, which confirms that all of the powder has been placed in suspension.

Comparative Example 1 of an Aqueous Semi-Finished Composition (SFC1)

Preparation of an aqueous, amine-free, semi-finished composition (SFC1) without polar aprotic solvent, but with a $d_{90}$ particle size of greater than 40 μm.
An aqueous semi-finished composition (SFC1) is produced with the following components, the respective quantities of which are listed below:

| | |
|---|---|
| Polyethersulfone (100% dry matter): | 119.1 g |
| Demineralized water: | 624.0 g |
| TOTAL | 743.1 g |

To produce the aqueous semi-finished composition (SFC1), an initial polyethersulfone powder is used, having a particle size ranging from 20 μm to 10 mm, and more specifically, a $d_{90}$ of between 40 and 60 μm and a $d_{50}$ of between 20 and 40 μm.
The process is as follows:
The polyethersulfone powder is placed into a mixer; then,
The demineralized water is added to the mixer; and finally,
The mixing step is performed.
The properties of the aqueous composition (SFC1) thus obtained are as follows:
Theoretical dry matter: 16.0%
Dry matter measured in the composition: 16.3%
This is a suspension that is opaque white in color.
The pH of this composition is between 6 and 7.
The composition obtained (SFC1) settles in less than one day.
A light diffraction particle sizing measurement using the Mastersizer laser particle size analyzer shows that a main peak is reached at $d_{50}$, centered on an average diameter of approximately 20 μm, as well as a main peak at $d_{90}$ centered on an average diameter of approximately 48 μm.

Comparative Example 2 of an Aqueous Semi-Finished Composition (SFC2)

Preparation of an Aqueous, Amine-Free, Semi-Finished Composition (SFC2) with Polar Aprotic Solvent.
An aqueous semi-finished composition (SFC2) is produced with the following components, the respective quantities of which are listed below:

| | |
|---|---|
| Polyethersulf one (100% dry matter): | 119.1 g |
| NFM: | 198.5 g |
| Demineralized water: | 344.5 g |
| TOTAL: | 662.1 g |

To produce the aqueous semi-finished composition (SFC2), an initial powder is used, having a particle size ranging from 20 µm to 10 mm, and more specifically, having a $d_{90}$ diameter of between 40 and 60 µm and a $d_{50}$ diameter of between 20 and 40 µm.

Placing the PES in suspension comprises a grinding step, the grinding being done in a Discontimill® brand bead mill at room temperature for a duration ranging from 15 to 30 hours, and preferably 12 to 24 hours, to reduce the size of the PES particles.

The process is as follows:
The polyethersulfone powder is placed into the mill; then,
The demineralized water is added to the mill;
The solvent is then added to the mill; and finally,
The grinding step is performed.

The properties of the aqueous composition (SFC2) thus obtained are as follows:
Theoretical dry matter: 18.0%
Dry matter measured in the composition: 18.1%
This is a suspension that is opaque white in color.
The pH of this composition is between 6 and 7.
The composition (SFC2) settles in less than one day. After returning the particles to suspension under mechanical agitation, we observe an apparent increase in viscosity of greater than 20% in less than one week.

Example 4 of an Aqueous Primary Composition According to the Invention (P1)

Preparation of an Aqueous Primary Composition (P1) Made from an Aromatic Polymer-Based, Amine-Free, Semi-Finished Composition without Polar Aprotic Solvent.

An aqueous semi-finished composition is produced with the following components, the respective quantities of which are listed below:

| Polyethersulfone (100% dry matter): | 119.1 g |
| Demineralized water: | 624.0 g |
| TOTAL: | 743.1 g |

To produce this aqueous semi-finished composition, an initial polyethersulfone powder is used, having a particle size ranging from 20 µm to 10 mm, and more specifically, a $d_{90}$ of between 40 and 60 µm and a $d_{50}$ of between 20 and 40 µm.

Placing the PES in suspension comprises a grinding step, the grinding being done in a Discontimill® brand bead mill at room temperature for a duration ranging from 15 to 30 hours, and preferably 12 to 24 hours, to reduce the size of the PES particles.

The process is as follows:
The polyethersulfone powder is placed into the mill; then,
The demineralized water is added to the mill; and finally,
The grinding step is performed.

The properties of this aqueous composition thus obtained are as follows:
Theoretical dry matter: 16.0%
Dry matter measured in the composition: 16.2%
This is a suspension that is opaque white in color.
A light diffraction particle sizing measurement using the Mastersizer laser particle size analyzer shows that a main peak is reached at $d_{50}$, centered on an average diameter of 5 to 10 µm and a $d_{90}$ of 19 µm, which confirms that all of the powder has been placed in suspension.

An aqueous primary composition (P1) for adhesion is produced with the following components, the respective quantities of which are listed below:

| PTFE dispersion: | 30.6 g |
| Carbon black dispersion: | 5.7 g |
| Semi-finished composition: | 33.3 g |
| NFM: | 10.0 g |
| Non-ionic surfactant system: | 4.8 g |
| Colloidal silica: | 12.3 g |
| Demineralized water: | 3.3 g |
| TOTAL: | 100.0 g |

Regarding the non-labeled polar aprotic solvent in the composition (P1), the NFM content is 10.0% by weight, with respect to the total weight of the composition (P1).

The proportion of fluorinated resin in the dry primary composition (P1) in on the order of 63%.

The properties of the primary composition (P1) thus obtained are as follows:
Theoretical dry matter in the composition: 29.4%
Viscosity (in a 2.5-mm flow cup according to standard DIN EN ISO 2433/ASTM D5125): 45 sec.

Example 5 of an Aqueous Primary Composition According to the Invention (P2)

Preparation of an Aqueous Primary Composition (P2) Based on the Semi-Finished Composition (SF1) in Example 1.

An aqueous primary composition (P2) for adhesion is produced with the following components, the respective quantities of which are listed below:

| PTFE dispersion: | 34.1 g |
| Carbon black dispersion: | 6.3 g |
| Semi-finished composition SF1 (18.2% dry matter): | 33.4 g |
| NFM: | 3.3 g |
| Non-ionic surfactant system: | 5.3 g |
| Colloidal silica: | 13.7 g |
| Demineralized water: | 3.9 g |
| TOTAL: | 100.0 g |

Regarding the non-labeled polar aprotic solvent in the composition (P2), the NFM content is 10.1% by weight, with respect to the total weight of the composition (P2).

The proportion of fluorinated resin in the dry primary composition (P2) is on the order of 63%.

The properties of the primary composition (P2) thus obtained are as follows:
Theoretical dry matter in the composition: 32.9%
Viscosity (in a 2.5-mm flow cup according to standard DIN EN ISO 2433/ASTM D5125): 51 sec.

Example 6 of an Aqueous Primary Composition According to the Invention (P3)

Preparation of an Aqueous Primary Composition (P3) Based on the Semi-Finished Composition (SF2) in Example 2.

An aqueous primary composition (P3) for adhesion is produced with the following components, the respective quantities of which are listed below:

| | |
|---|---|
| PTFE dispersion: | 34.1 g |
| Carbon black dispersion: | 6.3 g |
| Semi-finished composition SF2 (18.2% dry matter): | 33.4 g |
| Non-ionic surfactant system: | 5.3 g |
| Colloidal silica: | 13.7 g |
| Demineralized water: | 7.2 g |
| TOTAL: | 100.0 g |

Regarding the non-labeled polar aprotic solvent in the composition (P3), the NFM content is 5.0% by weight, with respect to the total weight of the composition (P3).

The proportion of fluorinated resin in the dry primary composition (P3) is on the order of 63%.

The properties of the primary composition (P3) thus obtained are as follows:
Theoretical dry matter in the composition: 32.9%
Viscosity (in a 2.5-mm flow cup according to standard DIN EN ISO 2433/ASTM D5125): 52 sec.

Example 7 of an Aqueous Primary Composition According to the Invention (P4)

Preparation of an Aqueous Primary Composition (P4) Based on the Aromatic Polymer-Based, Amine-Free, Semi-Finished Composition without Polar Aprotic Solvent, and a Heterocyclic Polymer-Based, Amine-Free, Semi-Finished Composition without Polar Aprotic Solvent.

An aqueous, aromatic polymer-based, semi-finished composition is produced with the following components, the respective quantities of which are listed below:

| | |
|---|---|
| Polyethersulf one (100% dry matter): | 119.1 g |
| Demineralized water: | 624.0 g |
| TOTAL: | 743.1 g |

This aqueous semi-finished composition is produced using an initial polyethersulfone powder, which has a particle size ranging from 20 μm to 10 mm, and more specifically, a $d_{90}$ of between 40 and 60 μm and a $d_{50}$ of between 20 and 40 μm.

Placing the PES in suspension comprises a grinding step, the grinding being done in a Discontimill® brand bead mill at room temperature for a duration ranging from 15 to 30 hours, and preferably from 12 to 24 hours, to reduce the size of the PES particles.

The process is as follows:
The polyethersulfone powder is placed into the mill; then,
The demineralized water is added to the mill; and finally,
The grinding step is performed.

The properties of the aqueous composition thus obtained are as follows:
Theoretical dry matter: 16.0%
Dry matter measured in the composition: 16.2%
This is a suspension that is opaque white in color.
A light diffraction particle sizing measurement using the Mastersizer laser particle size analyzer shows that a main peak is reached at $d_{50}$, centered on an average diameter of 5 to 10 μm and a $d_{90}$ of 19 μm, which confirms that all of the powder has been placed in suspension.

An aqueous, heterocyclic polymer-based, semi-finished composition is produced with the following components, the respective quantities of which are listed below:

| | |
|---|---|
| Polyamide-amic acid: | 616.0 g |
| Demineralized water: | 726.3 g |
| TOTAL: | 1342.3 g |

To make this aqueous semi-finished composition, a 3-liter jar mill system is used to obtain a paste consisting of a stable suspension of polyamide-amic acid particles in water, the final particle size of which is significant for spray coating and obtaining adhesion properties in the resulting coating.

The process is as follows:
The polyamide-amic acid powder, the initial particle size of which varies from a few hundred microns to mm, is placed into the jar; then,
The demineralized water is added;
The jar is kept at room temperature with the mixture thus obtained and the beads on rollers for the duration necessary and sufficient to reduce the size of the polyamide-amic acid particles.

The proportion of toxic polar aprotic solvent in this semi-finished composition, which is NMP, is less than 2.3% by weight, with respect to the total weight of the composition.

The properties of this semi-finished aqueous composition thus obtained are as follows:
Theoretical dry matter: 16.3%
Dry matter measured in the composition: 16.2%
This is a suspension that is creamy white in color.
A light diffraction particle sizing measurement using the Mastersizer laser particle size analyzer shows that a main peak is reached at $d_{50}$, centered on an average diameter of between 5 and 6 μm and a $d_{90}$ of 19 μm, which confirms that all of the powder has been placed in suspension.

Next, an aqueous primary composition (P4) for adhesion is produced with the following components, the respective quantities of which are listed below:

| | |
|---|---|
| PTFE dispersion: | 30.8 g |
| Carbon black dispersion: | 5.7 g |
| Aromatic polymer-based semi-finished composition: | 29.7 g |
| Heterocyclic polymer-based semi-finished composition: | 3.6 g |
| NFM: | 10.1 g |
| Non-ionic surfactant system: | 4.8 g |
| Colloidal silica: | 12.3 g |
| Demineralized water: | 3.0 g |
| TOTAL: | 100.0 g |

Regarding the non-labeled polar aprotic solvent in the composition (P4), the NFM content is 10.1% by weight, with respect to the total weight of the composition (P4).

Regarding the toxic polar aprotic solvents in the composition (P4), the NMP is contained in trace amounts with respect to the total composition (P4) (<0.1%); the NMP comes from the heterocyclic polymer-based semi-finished composition.

The proportion of fluorinated resin in the dry primary composition (P4) is on the order of 63%.

The properties of the primary composition (P4) thus obtained are as follows:
Theoretical dry matter in the composition: 29.6%
Viscosity (in a 2.5-mm flow cup according to standard DIN EN ISO 2433/ASTM D5125): 51 sec.

Example 8 of an Aqueous Primary Composition According to the Invention (P5)

Preparation of an Aqueous Primary Composition (P5) Based on the Semi-Finished Composition (SF3) in Example 3.

An aqueous primary composition (P5) for adhesion is produced with the following components, the respective quantities of which are listed below:

| | |
|---|---|
| PTFE dispersion: | 34.1 g |
| Carbon black dispersion: | 6.3 g |
| Semi-finished composition SF3 (18.2% dry matter): | 33.4 g |
| Non-ionic surfactant system: | 5.3 g |
| Colloidal silica: | 13.7 g |
| Demineralized water: | 7.2 g |
| TOTAL: | 100.0 g |

Regarding the non-labeled polar aprotic solvent in the composition (P5), the NFM content is 5.0% by weight, with respect to the total weight of the composition (P5).

The proportion of fluorinated resin in the dry primary composition (P5) is on the order of 63%.

The properties of the primary composition (P5) thus obtained are as follows:
Theoretical dry matter in the composition: 33.0%
Viscosity (in a 2.5-mm flow cup according to standard DIN EN ISO 2433/ASTM D5125): 51 sec.

Example 9 of an Aqueous Primary Composition According to the Invention (P6)

Preparation of an Aqueous Primary Composition (P6) Based on the Semi-Finished Composition (SF3) in Example 3 and a Heterocyclic Polymer-Based Semi-Finished Composition.

An aqueous, heterocyclic polymer-based, semi-finished composition is produced with the following components, the respective quantities of which are listed below:

| | |
|---|---|
| Polyamide-amic acid: | 616.0 g |
| Demineralized water: | 726.3 g |
| TOTAL: | 1342.3 g |

To make this aqueous semi-finished composition, a 3-liter jar mill system is used to obtain a paste consisting of a stable suspension of polyamide-amic acid particles in water, the final particle size of which is significant for spray coating and obtaining adhesion properties in the resulting coating. The process is as follows:
The polyamide-amic acid powder, the initial particle size of which varies from a few hundred microns to mm, is placed into the jar; then,
The demineralized water is added;
The jar is kept at room temperature with the mixture thus obtained and the beads on rollers for the duration necessary and sufficient to reduce the size of the polyamide-amic acid particles.

The proportion of toxic polar aprotic solvent in this semi-finished composition, which is NMP, is less than 2.3% by weight, with respect to the total weight of the composition.

The properties of this semi-finished aqueous composition thus obtained are as follows:
Theoretical dry matter: 16.3%
Dry matter measured in the composition: 16.2%
This is a suspension that is creamy white in color.
A light diffraction particle sizing measurement using the Mastersizer laser particle size analyzer shows that a main peak is reached at $d_{50}$, centered on an average diameter of between 5 and 6 µm and a $d_{90}$ of 19 µm, which confirms that all of the powder has been placed in suspension.

Next, an aqueous primary composition (P6) for adhesion is produced with the following components, the respective quantities of which are listed below:

| | |
|---|---|
| PTFE dispersion: | 34.1 g |
| Carbon black dispersion: | 6.3 g |
| Semi-finished composition SF3 (18.2% dry matter): | 30.0 g |
| Heterocyclic polymer-based semi-finished composition: | 4.1 g |
| NFM: | 1.0 g |
| Non-ionic surfactant system: | 5.3 g |
| Colloidal silica: | 13.7 g |
| Demineralized water: | 5.5 g |
| TOTAL: | 100.0 g |

Regarding the non-labeled polar aprotic solvent in the composition (P6), the NFM content is 5.5% by weight, with respect to the total weight of the composition (P6).

Regarding the toxic polar aprotic solvent in the composition (P6), the NMP is contained in trace amounts with respect to the total composition (P6) (<0.1%); the NMP comes from the heterocyclic polymer-based semi-finished composition.

The proportion of fluorinated resin in the dry primary composition (P6) is on the order of 62%.

The properties of the primary composition (P6) thus obtained are as follows:
Theoretical dry matter in the composition: 32.9%
Viscosity (in a 2.5-mm flow cup according to standard DIN EN ISO 2433/ASTM D5125): 50 sec.

Comparative Example 3 of an Aqueous Primary Composition (PC1)

Preparation of an Aqueous Primary Composition (PC1) Based on an Aromatic Polymer-Based, Amine-Free, Semi-Finished Composition without Polar Aprotic Solvent.

An aqueous primary composition (PC1) for adhesion is produced with the following components, the respective quantities of which are listed below:

| | |
|---|---|
| PTFE dispersion: | 30.6 g |
| Carbon black dispersion: | 5.7 g |
| Semi-finished composition: | 33.3 g |
| Non-ionic surfactant system: | 4.8 g |
| Colloidal silica: | 12.3 g |
| Demineralized water: | 13.3 g |
| TOTAL: | 100.0 g |

The proportion of fluorinated resin in the dry primary composition (PC1) is on the order of 63%.

The properties of the primary composition (PC1) thus obtained are as follows:
Theoretical dry matter in the composition: 29.4%

Viscosity (in a 2.5-mm flow cup according to standard DIN EN ISO 2433/ASTM D5125): 48 sec.

Comparative Example 4 of an Aqueous Primary Composition (PC2)

Preparation of an Aqueous Primary Composition (PC2) Based on the Semi-Finished Composition (SFC1) in Comparative Example 1.

An aqueous primary composition (PC2) for adhesion is produced with the following components, the respective quantities of which are listed below:

| | |
|---|---|
| PTFE dispersion: | 30.6 g |
| Carbon black dispersion: | 5.7 g |
| Semi-finished composition SFC1 (16.0% dry matter): | 33.3 g |
| NFM: | 11.0 g |
| Non-ionic surfactant system: | 4.8 g |
| Colloidal silica: | 12.3 g |
| Demineralized water: | 2.3 g |
| TOTAL: | 100.0 g |

Regarding the non-labeled polar aprotic solvent in the composition (PC2), the NFM content is 11.0% by weight, with respect to the total weight of the composition (PC2).

The proportion of fluorinated resin in the dry primary composition (PC2) is on the order of 63%.

The properties of the primary composition (PC2) thus obtained are as follows:

Theoretical dry matter in the composition: 29.5%

Viscosity (in a 2.5-mm flow cup according to standard DIN EN ISO 2433/ASTM D5125): 48 sec.

Comparative Example 5 of an Aqueous Primary Composition (PC3)

Preparation of an Aqueous Primary Composition (PC3) Based on the Semi-Finished Composition (SFC2) in Comparative Example 2.

An aqueous primary composition (PC3) for adhesion is produced with the following components, the respective quantities of which are listed below:

| | |
|---|---|
| PTFE dispersion: | 29.7 g |
| Carbon black dispersion: | 5.5 g |
| Semi-finished composition SFC2 (18.0% dry matter): | 28.6 g[1] |
| NFM: | 17.7 g |
| Non-ionic surfactant system: | 4.6 g |
| Colloidal silica: | 11.9 g |
| Demineralized water: | 2.0 g |
| TOTAL: | 100.0 g |

Regarding the non-labeled polar aprotic solvent in the composition (PC3), the NFM content is 26.3% by weight, with respect to the total weight of the composition (PC3).

The proportion of fluorinated resin in the dry primary composition (PC3) is on the order of 63%.

The properties of the primary composition (PC3) thus obtained are as follows:

Theoretical dry matter in the composition: 28.5%

Viscosity (in a 2.5-mm flow cup according to standard DIN EN ISO 2433/ASTM D5125): 47 sec.

Results of the Tests Performed

The semi-finished and primary compositions described above are listed in Tables 1 and 2 below.

The primary compositions are evaluated for their stability in terms of viscosity.

The coatings obtained from these various compositions are subject to adhesion testing of the primary composition on the substrate, to the coloration test and to the corrosion resistance test. The primary compositions according to the invention have been observed to be stable over time and make it possible to obtain corrosion-resistant coatings; therefore, these primary compositions offer good film formation properties.

The coloration of the coating, evaluated visually, makes it possible to verify that the formulas produced according to the invention show acceptably little to no yellowing in comparison to the traditional formulations that include Lewis bases.

Coating adhesion is ensured when the size of the powder is compliant with the invention.

TABLE 1

SEMI-FINISHED

| | | | | | | |
|---|---|---|---|---|---|---|
| | — | SF1 | SF2 | — | SF3 | SF3 and PAA powder |
| | — | Ex. 1 | Ex. 2 | — | Ex. 3 | Ex. 3 |
| Resin type | PES powder | PES powder | PES powder | PAI + PES powder | PES and PPS powder | PES, PPS and PAI powder |
| Amine type | 0 | 0 | 0 | 0 | 0 | 0 |
| Resin particle size | $d_{90} < 20$ μm $d_{50} < 10$ μm | $d_{90} < 20$ μm $d_{50} < 10$ μm | $d_{90} < 20$ μm $d_{50} < 10$ μm | $d_{90} < 20$ μm $d_{50} < 10$ μm | $d_{90} < 20$ μm $d_{50} < 10$ μm | $d_{90} < 20$ μm $d_{50} < 10$ μm |
| Polar aprotic solvent | 0 | NFM = 20.3% | NFM = 14.9% | NMP < 2.3% in PAI | NFM = 14.9% | NFM = 14.9% in SF5 and NMP < 2.3% |

PRIMARY

Primary composition

| | P1 | P2 | P3 | P4 | P5 | P6 |
|---|---|---|---|---|---|---|
| | Ex. 4 | Ex. 5 | Ex. 6 | Ex. 7 | Ex. 8 | Ex. 9 |
| Labeled polar aprotic solvent | 0 | 0 | 0 | NMP < 0.1% | 0 | NMP < 0.1% |

TABLE 1-continued

| Non-labeled polar aprotic solvent | NFM = 10.0% | NFM = 10.1% | NFM = 5.0% | NFM = 10.1% | NFM = 5.0% | NFM = 5.5% |
|---|---|---|---|---|---|---|
| Primary labeling | NO | NO | NO | NO | NO | NO |
| TESTS | | | | | | |
| Coating coloration | None | None | None | Very slight yellowing | Very slight yellowing | Very slight yellowing |
| Adhesion test on smooth Al substrate | Excellent | Excellent | Excellent | Excellent | Excellent | Excellent |
| Stability | Compliant | Compliant | Compliant | Compliant | Compliant | Compliant |
| Corrosion resistance | Compliant (rated 100) | Compliant (rated 100) | Compliant (rated 100) | Compliant (rated 100) | Compliant (rated 100) | Compliant (rated 100) |

TABLE 2

| | Semi-finished composition | — | SFC1 | SFC2 |
|---|---|---|---|---|
| SEMI-FINISHED | | | | |
| | | — | Comp. Ex. 1 | Comp. Ex. 2 |
| | Resin type | PES powder | PES powder | PES powder |
| | Amine type | 0 | 0 | 0 |
| | Resin particle size | $d_{90} < 20$ μm $d_{50} < 10$ μm | $d_{90} < 20$ μm $d_{50} < 10$ μm | $d_{90} < 20$ μm $d_{50} < 10$ μm |
| | Polar aprotic solvent | 0 | 0 | NFM = 30.0% |
| PRIMARY | Primary composition | PC1 | PC2 | PC3 |
| | | Comp. Ex. 3 | Comp. Ex. 4 | Comp. Ex. 5 |
| | Labeled polar aprotic solvent | 0 | 0 | 0 |
| | Non-labeled polar aprotic solvent | 0 | NFM = 11.0% | NFM = 26.3 |
| | Primary labeling | NO | NO | NO |
| TESTS | Coating coloration | None | None | None |
| | Adhesion test on smooth Al substrate | Poor | Poor | Poor |
| | Stability | Non-compliant | Non-compliant | Non-compliant |
| | Corrosion resistance | Very poor (rated 0) | Compliant (rated 100) | Very poor (rated 0) |

The invention claimed is:

1. An aqueous, amine-free, non-stick coating composition formed over at least one side of a metal substrate, the non-stick coating composition comprising:
   an aqueous coating composition;
   at least one fluorocarbon resin; and
   a non-toxic polar aprotic solvent,
   wherein a content of the non-toxic polar aprotic solvent in the non-stick coating composition is greater than 0% and less than or equal to 15% by weight, with respect to a total weight of the non-stick coating composition,
   wherein the aqueous coating composition comprises:
      at least one aromatic polymer, selected from the group consisting of polyethersulfones (PES), polyether ether sulfones (PEES), polyphenylsulfones (PPSU), polyphenylene sulfides (PPS), polyether ether ketones (PEEK), polyether ketones (PEK), polyether ketone ketones (PEKK), polyether ether ketone ketones (PEEKK), and polyether ketone ether ketone ketones (PEKEKK), and being in powder form with a $d_{90}$ of more than or equal to 10 μm and less than or equal to 20 μm; and
      a polar aprotic solvent, wherein a content of the polar aprotic solvent in the aqueous coating composition is between 0 and 25% by weight, with respect to a total weight of the aqueous coating composition,
   wherein the non-toxic polar aprotic solvent is N-formylmorpholine (NFM), N-acetylmorpholine (NAM), N-ethylpyrrolidone (NEP) or dimethyl sulfoxide (DMSO).

2. The non-stick coating composition according to claim 1, comprising a maximum of 1% toxic polar aprotic solvent by weight, with respect to the total weight of the non-stick coating composition.

3. The non-stick coating composition according to claim 1, wherein the aqueous coating composition further comprises at least one heterocyclic polymer, which is in powder form with a $d_{90}$ diameter of less than or equal to 20 μm, and a relative content of the aromatic polymer, with respect to the heterocyclic polymer in the coating composition, is greater than or equal to 50:50 and less than 100:0.

4. The non-stick coating composition according to claim 3, wherein the at least one heterocyclic polymer is selected from the group consisting of polyimides (PI), polyamide-imides (PAI), polyetherimides (PEI), polyamide-amic acids and mixtures thereof.

5. The non-stick coating composition according to claim 3, wherein a total relative content by weight of the at least one aromatic polymer and the at least one heterocyclic polymer, with respect to the at least one fluorocarbon resin is between 20:80 to 25:75.

6. The non-stick coating composition according to claim 1, wherein a content of the at least one fluorocarbon resin is 30 to 80% by weight, of the total dry weight of the non-stick coating composition.

7. The non-stick coating composition according to claim 1, wherein the non-toxic polar aprotic solvent is NFM or DMSO.

* * * * *